United States Patent [19]

Tsutsumi et al.

[11] Patent Number: 4,555,330
[45] Date of Patent: Nov. 26, 1985

[54] METHOD AND APPARATUS FOR SEPARATING MATERIAL

[75] Inventors: Masataka Tsutsumi, Canton; Richard J. Frohman, Massillon, both of Ohio

[73] Assignee: Midwestern Industries, Inc., Massillon, Ohio

[21] Appl. No.: 526,951

[22] Filed: Aug. 29, 1983

[51] Int. Cl.$^4$ .............................................. B07B 1/28
[52] U.S. Cl. .................................... 209/254; 209/246; 209/319; 209/403; 209/910; 209/911
[58] Field of Search ............... 209/680, 910, 911, 922, 209/236, 240, 242, 243, 244, 246, 402, 403, 314, 315, 319, 355, 381, 382, 245, 254; 222/129, 189, 560, 564, 196, 270

[56] References Cited

U.S. PATENT DOCUMENTS

| | | | |
|---|---|---|---|
| 2,274,700 | 3/1942 | Jenks | 209/403 |
| 2,705,076 | 3/1955 | Howard et al. | 209/244 |
| 2,908,391 | 10/1959 | Frevert | 209/315 |
| 3,374,888 | 3/1968 | Volpert | 209/319 |
| 3,439,800 | 4/1969 | Tonjes | 209/314 |
| 3,826,367 | 7/1974 | Hubach | 209/243 |
| 3,854,637 | 12/1974 | Muller, Jr. et al. | 222/564 |
| 4,288,320 | 9/1981 | Wilson | 209/382 |
| 4,322,288 | 3/1982 | Schmidt | 209/240 |
| 4,390,420 | 6/1983 | Tenhaaf | 209/319 |

Primary Examiner—Robert B. Reeves
Assistant Examiner—Donald T. Hajec
Attorney, Agent, or Firm—Renner, Kenner, Greive & Bobak Co.

[57] ABSTRACT

The method and apparatus for separating materials includes a feed splitting assembly (27) which evenly divides the materials to be separated into equal parts for inputs to a like plurality of screen assemblies (16, 17, 18). These inputs are evenly distributed across the width of some of the screen assemblies (17, 18) by manifolds (44, 51). One of the screen assemblies (16) can receive the input directly through an aperture (40) in the feed splitting assembly (27). The material not passing through the screen assemblies (16, 17, 18) is collected at one location and the material passing therethrough is transmitted to a common discharge spout (55).

13 Claims, 11 Drawing Figures

METHOD AND APPARATUS FOR SEPARATING MATERIAL

TECHNICAL FIELD

This invention relates to a method and apparatus for separating materials into two groups by size such as a solid material from a liquid material. More particularly, this invention relates to a method and apparatus which efficiently separates solid materials from liquid materials by presenting the materials uniformly and concurrently across a plurality of screens.

BACKGROUND ART

In circumstances where it is desired to separate materials into two size groups, such as the separation of solid material from liquid material, usually the materials are merely fed to a machine having a screen, which can be vibrated, to effect the desired separation. In such circumstances the materials are usually merely piped to and deposited at the center of the screen, in the case of a circular screen wherein the solids are discharged at the periphery, or, in the case of a rectangular inclined screen, the materials are deposited at the top thereof with the solids being allowed to fall off the screen at the bottom. This type of separation results in a very inefficient use of screen area since only a small portion of the screen is actually performing the separation.

One attempt at more efficient screening is disclosed in U.S. Pat. No. 4,065,382. There the feed is split into a plurality of feeds to be fed to parallel tilted screens. In an attempt to universally distribute the feeds over the screens, the material is splashed onto a flange. However, such action does not guarantee an even distribution across the entire width of the screens.

Another problem involved with the aforementioned screening operations is that because the screens are usually of a very fine mesh to permit only liquids to pass therethrough, they wear out very easily. As a solution to this problem, it has been proposed to provide a screen package which consists of the necessary fine mesh screen and a heavier back-up screen of larger mesh. The two screens are tensioned together and the back-up screen provides the fine mesh screen with additional support for longer life. While such a design is satisfactory for this purpose, the fine mesh screen does eventually wear out and then the entire screen package must be replaced including the costly back-up screen, even though it has not at all worn. Furthermore, even tensioning of both screens together is not possible because while the back-up screen may be properly tensioned, the finer screen will tend to be looser than desired.

DISCLOSURE OF THE INVENTION

It is therefore a primary object of the present invention to provide a method and apparatus for the efficient separation of materials, for example, solids from liquids.

It is another object of the present invention to provide a method and apparatus, as above, in which the input feed of the materials is split into a plurality of parts and fed to a like plurality of screen assemblies vertically arranged relative to each other.

It is a further object of the present invention to provide a method and apparatus, as above, wherein the materials are fed to the screens uniformly across the entire width of the screens.

It is yet another object of the present invention to provide a method and apparatus, as above, in which the uniform feeding of the materials can be closely controlled.

It is a still further object of the present invention to provide a method and apparatus, as above, in which a screen of fine mesh and a back-up screen of heavier mesh are utilized but separately tensioned for ease of replacement and to provide adequate tensioning.

These and other objects of the present invention, which will become apparent from the description to follow, are accomplished by the means hereinafter described and claimed.

In general, the method and apparatus for separating materials includes a feed splitting assembly which receives the materials to be separated and evenly divides this input into a plurality of inputs for a like plurality of screen assemblies vertically arranged relative to each other. These inputs are fed to a device over each screen which evenly distributes the inputs across the width of each screen. The material not passing through the screens is collected at one location and the material passing through the screens is collected and transmitted to a common collection point.

PREFERRED EMBODIMENT FOR CARRYING OUT THE INVENTION

Figure 1:
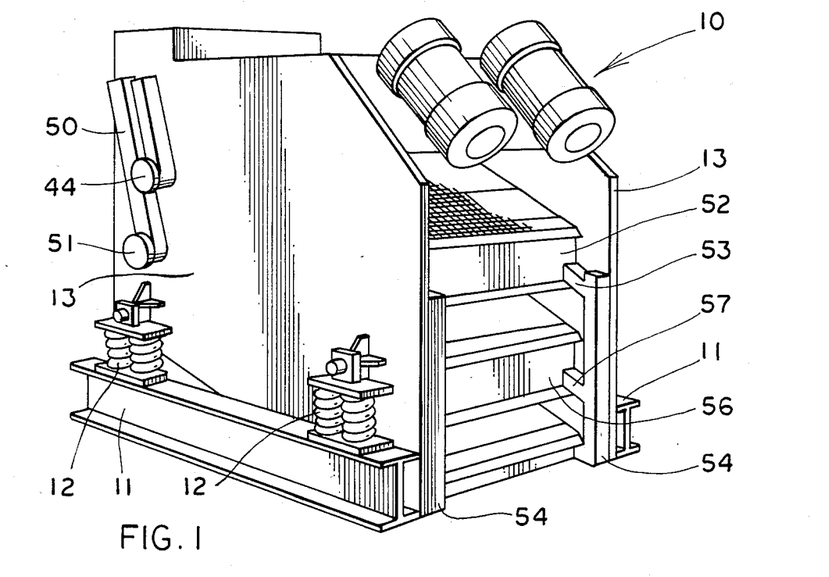
FIG. 1 is a somewhat schematic elevational view of the material separating machine according to the concept of the present invention.

A material separating apparatus according to the present invention is indicated generally by the numeral 10 in FIG. 1 and is schematically shown as being mounted on two fixed I-beam pedestals 11. Pedestals 11 support springs 12 which are attached to upstanding vibratory side frame members 13. A motor mount plate 14 is supported by frame members 13 and carries two vibratory motors 15 preferably of the type which have an adjustable amplitude to control the vibrations imparted to separator 10. Thus, the material separator 10 including side frames 13 and everything supported thereby will be vibrated by motors 15.

Figure 2:
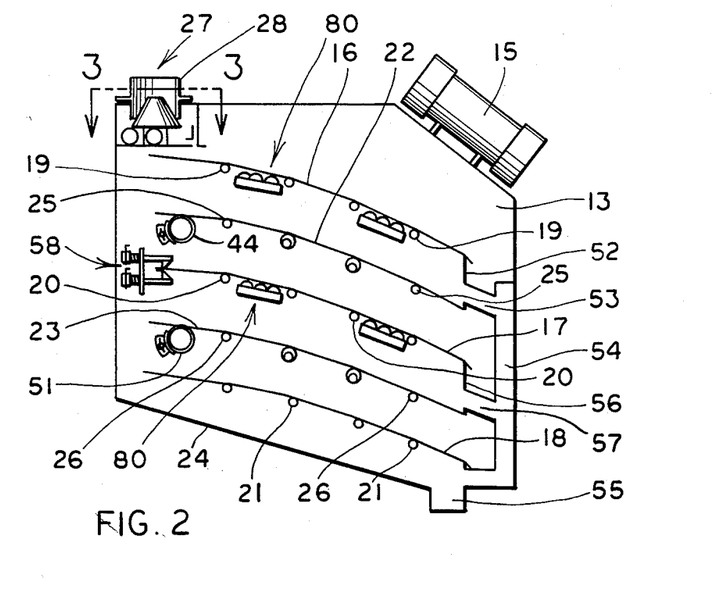
FIG. 2 is a somewhat schematic cross section of the machine of FIG. 1.

As best shown in FIG. 2, mounted between frames 13 are a plurality of screen assemblies 16, 17, and 18 vertically arranged relative to each other and supported by sets of rods 19, 20, and 21, respectively, extending between side frames 13. Beneath screen assemblies 16 and 17 are collection plates 22 and 23, respectively, onto which the material which passes through screens 16 and 17 falls. The bottom 24 of material separator 10 acts as the collection plate for the material which passes through screen 18. Plates 22 and 23 are supported by sets of rods 25 and 26, respectively, extending between side frames 13. If desired, any or all of the rods 25 and 26, can be made in the form of a spray manifold which would receive water under pressure to emit a spray onto the screens therebelow to clear the same and increase the throughput efficiency.

Figure 3:
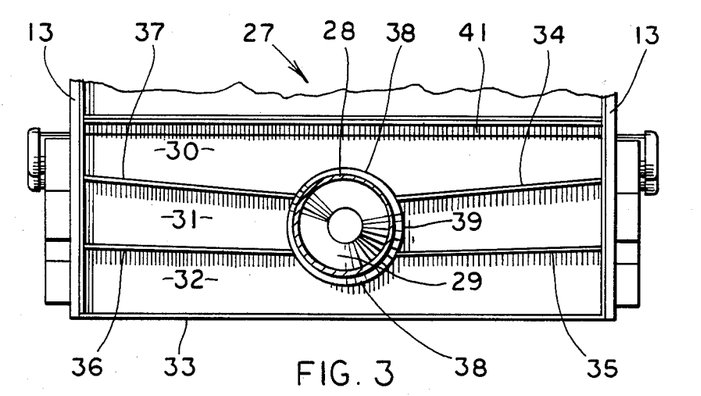
FIG. 3 is a sectional view of the feed splitting assembly taken substantially along line 3—3 of FIG. 2.
Figure 4:
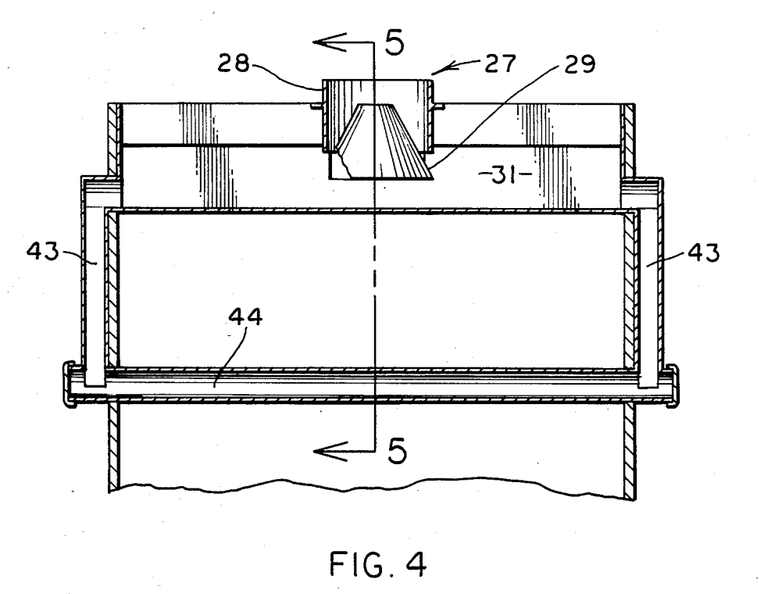
FIG. 4 is a sectional view of the feed devices taken substantially along line 4—4 of FIG. 5.
Figure 5:
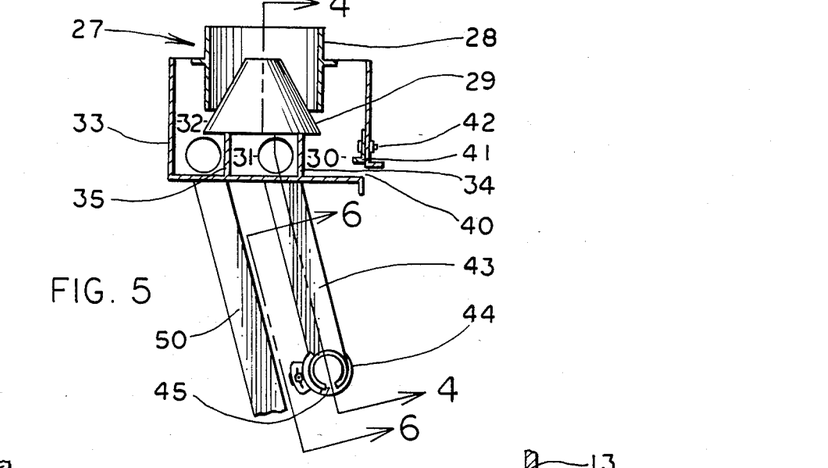
FIG. 5 is a sectional view of the feed devices taken substantially along line 5—5 of FIG. 4.

An input feed splitting assembly, generally indicated by the numeral 27, receives the material to be separated through an input pipe 28 and splits the same into three approximately equal parts to provide material to screen assemblies 16, 17, and 18. It should be appreciated that three screens are merely shown by way of example and that any plurality of screens could be provided, with feed splitting assembly 27 splitting the feed into a like plurality of parts. Feed splitting assembly 27 includes a flow diverter 29 which is shaped like a truncated cone. The material being fed through pipe 28 contacts flow diverter 29 and is directed to three input chambers 30, 31, and 32 within a generally rectangular input basin 33. As best shown in FIGS. 3 and 5, chambers 30, 31, and 32 are defined by four divider plates 34, 35, 36 and 37 which extend from the ends of basin 33 to flow diverter 29. As shown in FIG. 4, the flow diverter 29 is partially recessed within the divider. It should be noted that in the preferred form, plates 34, 35, 36 and 37 are not precisely perpendicular to the walls of basin 33 but are rather at a slight angle away from perpendicular. This is preferred because the vibratory throw of motors 15 (in the upward direction in FIG. 3) causes more material to go toward chamber 32 and the angled plates 34, 35, 36 and 37 compensate for this throw of material to assure as best possible even distribution in chambers 30, 31 and 32. Plates 34, 35, 36 and 37 connect to flow diverter 29 at circumferential points dividing flow diverter 29 into two 120° arcs 38 feeding chambers 30 and 32 and two 60° arcs 39 both feeding chamber 31. Thus, material fed in through pipe 28 is evenly diverted to chambers 30, 31, and 32.

As best shown in FIG. 5 chamber 30 is provided with an opening 40 along the entire bottom at one edge thereof. Opening 40 is directly over and runs the entire width of screen assembly 16. Thus, the portion of material in chamber 30 is readily and evenly distributed on screen assembly 16. Opening 40 is adjustable from the fully open position shown in FIG. 5 to a fully closed position by means of a movable bracket 41 which is slotted to receive fastener assembly 42 and which is held by a wall of basin 33. Thus, by loosening fastener assembly 42, bracket 41 may be positioned to control the amount of feed to screen assembly 16.

Figure 6:
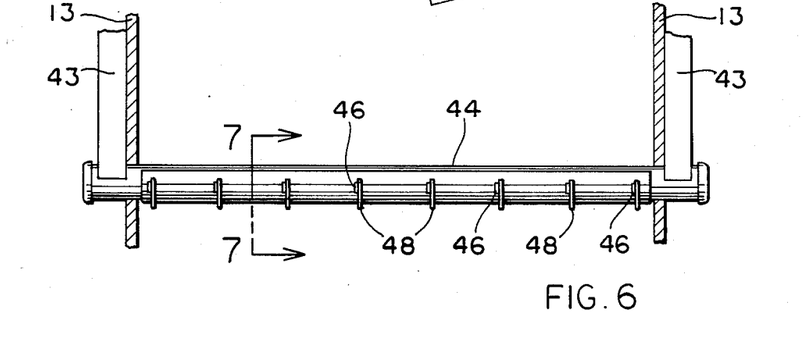
FIG. 6 is a sectional view taken substantially along line 6—6 of FIG. 5.
Figure 7:
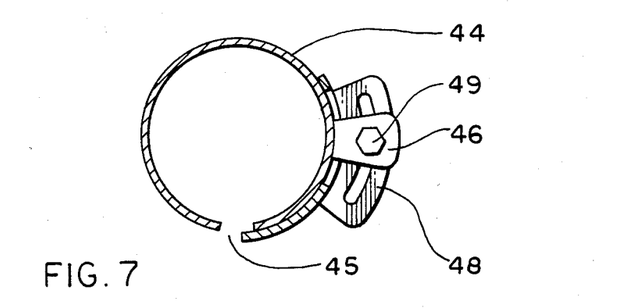
FIG. 7 is a sectional view taken substantially along line 7—7 of FIG. 6.

As best shown in FIGS. 4 and 5, chamber 31 communicates at the bottom of each end thereof with piping 43 which runs along the outside of frames 13 and communicates with each end of manifold piping 44. Manifold 44 extends across the width of the material separator above screen assembly 17 and is provided, throughout its length, with an opening 45. As best shown in FIGS. 6 and 7, manifold piping 44 has a plurality of ears 46 extending radially therefrom and spaced along its length. An arcuate throttle plate 47 extending the length of manifold 44 has a like plurality of slotted ears 48 extending therefrom. Ears 46 are connected to ears 48, as by fasteners 49, to hold throttle plate 47 at the desired location circumferentially of manifold 44 to adjust the size of opening 45. Thus, by loosening fasteners 49, plate 47 may be moved to adjust the size of opening 45 and control the amount of feed to screen assembly 17.

Chamber 32 of basin 33 communicates at the bottom of each end thereof with piping 50 which runs along the outside of frames 13 generally parallel to piping 43. Piping 50 communicates with each end of manifold piping 51 which extends across the width of the material separator above screen assembly 18. As schematically shown in FIG. 2, manifold piping 51 has an adjustable opening in the bottom thereof and is identical to manifold 44 with its throttle plate 47 just described. Thus, the amount of feed across the entire width of screen assembly 18 may be similarly adjustably controlled.

As shown in FIGS. 1 and 2, the material which passes through screen assembly 16 is collected on plate 22 and retained therein by front wall 52. Wall 52 is provided with openings at the bottom of each end thereof which communicate with channels 53 which transfer the material to vertical channels 54 at the front of the material separator which further transfer the material to a discharge spout 55 at the bottom thereof. The material which passes through screen assembly 17 is collected on plate 23 and retained thereon by front wall 56. Wall 56 is provided with openings at the bottom of each end thereof which communicate with channels 57 which transfer the material to vertical channels 54 and on to spout 55. The material passing through screen assembly 18 joins with the material in channel 54 and passes directly through spout 55. Thus all of the material which passes through the screen assemblies is joined at a common discharge point for conventional collection.

The materials which do not pass through screen assemblies 16, 17, and 18 may merely be vibrated off the front of the screen assemblies and collected in a hopper (not shown) located at the front of the machine.

A screen assembly tensioning device is indicated generally by the numeral 58 and shown schematically in FIG. 2 as tensioning screen assembly 17. Although no such tensioning devices have been shown in FIG. 2 for screen assemblies 16 and 18, it should be appreciated that each screen assembly is provided with identical tensioning devices. A typical such tensioning device 58 is shown in detail in FIGS. 8 and 9 as operating to tension, for example, screen assembly 17.

Figure 8:
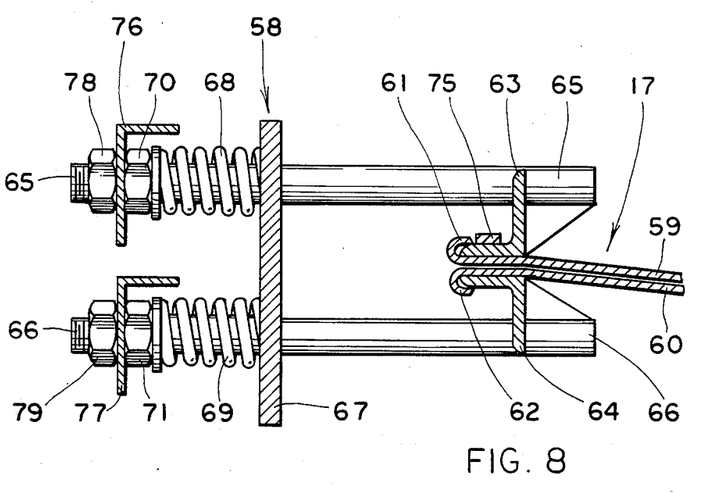
FIG. 8 is a partially elevational, partially sectional view of the screen tensioning assembly according to the concept of the present invention.
Figure 9:
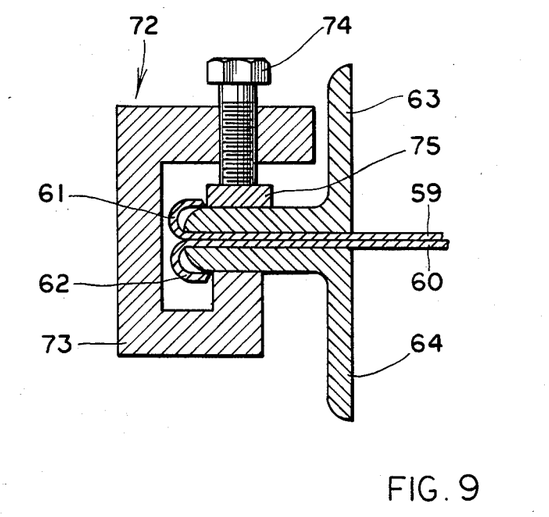
FIG. 9 is a partially elevational, partially sectional view of a screen clamping mechanism.

Screen assembly 17 (screen assemblies 16 and 18 being identical) actually consists of two screens adjacent each other. Screen 59 is of a fine mesh, the size of which is determined dependent on the materials to be separated. If material separtor 10 is being used to separate solids from liquids, as would most typically be its application, screen 59 would be of a very fine mesh permitting basically only liquids to pass therethrough. A backing screen 60 is adjacent screen 59 and is of a larger mesh than screen 59 so that any material passing through screen 59 will also pass through screen 60. Screen 60 is preferably made of a heavy gage wire which provides support for the more delicate screen 59 and increases the life thereof.

Screens 59 and 60 are independently tensioned by tensioning device 58. A similar tensioning device for a single screen is described in detail in U.S. Pat. No. 4,319,992 to which reference is made for whatever details may be necessary to more fully understand the operation of tensioning device 58. The end of screens 59 and 60 are provided with rigid hook members 61 and 62, respectively, which hook around angle irons 63 and 64, respectively, attached to draw bolts 65 and 66, respectively. Draw bolts 65 and 66 extend through a stationary bearing plate 67. Heavy duty springs 68 and 69 are positioned around draw bolts 65 and 66, respectively, between bearing plate 67 and tensioning nuts 70 and 71, respectively. Horizontal movements of draw bolts 65 and 66 by rotation of nuts 70 and 71, respectively, will tighten screens 59 and 60 by pulling on hook members 61 and 62, screens 59 and 60 being conventionally permanently held at the other ends thereof. As the screens are being independently tensioned, there may be a tendency for them to separate slightly. A clamp member 72 can be provided to tightly hold the screens together. Clamp member 72 includes a C-shaped clamp 73, the jaws of which are positioned so that clamp bolt 74 engages bearing plate 75 mounted on angle iron 63. The other side of clamp 73 engages angle iron 64. A clamp member 72 may be conveniently positioned adjacent each tensioning device 58.

Each screen assembly is provided with a plurality of tensioning devices 58 so that the screens may be evenly tensioned across their entire width. As described in more detail in said U.S. Pat. No. 4,319,992, primarily for safety purposes it is desirable to tie all the draw bolts for each screen together. To that end, bars 76 and 77 connect all of the tensioning devices together and are held thereto by jam nuts 78 and 79. Therefore, if one draw bolt should happen to break, possible injury-causing recoil is prevented by the connection to all the other tensioning devices.

It should be appreciated that although backing screen 60 increases the life of screen 59, such screen does eventually wear and need replacing. By providing separate screens 59 and 60 and by providing individual tensioning thereof by device 58, screen 59 may be readily replaced alone. Furthermore, independent tensioning is the only way to assure proper tensioning on both screens.

Figure 10:
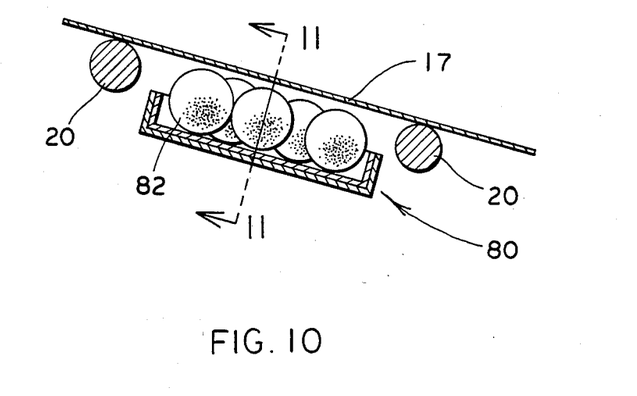
FIG. 10 is a somewhat schematic sectional view of a self-cleaning feature according to the concept of the present invention.
Figure 11:
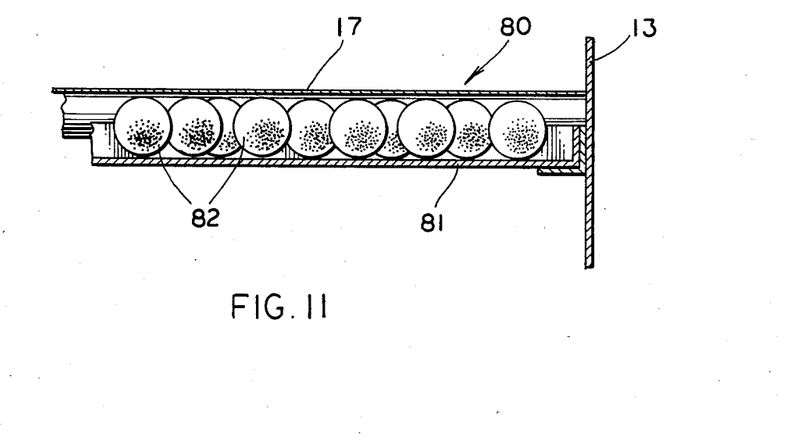
FIG. 11 is a sectional view taken substantially along line 11—11 of FIG. 10.

Material separator 10 can also be conveniently provided with screen cleaning features which supply vibrations secondary to those provided by motors 15 and increase the overall efficiency. Such screen cleaning features are indicated generally by the numeral 80 and shown schematically in FIG. 2 and in more detail in FIGS. 10 and 11. Any desired number of trays 81 may be mounted between frames 13 under any of the screen assemblies, for example, screen assembly 17 is depicted in FIGS. 10 and 11. Rubber balls 82 or other agitating devices in trays 81 vibrate against screen assembly 17 to further agitate the same thereby cleaning the screen of any clinging materials and providing secondary vibrations therein.

It should thus be evident that a material separating device constructed in accordance with the invention described herein substantially improves the art and otherwise accomplishes the objects of the invention.

We claim:

1. Apparatus for separating materials by size comprising:

frame means;

means to vibrate the apparatus to facilitate separating the materials, said means generating a vibratory throw;

a plurality of screen assemblies secured to said frame means and vertically arranged relative to each other;

a basin supported by said frame means;

a conically shaped flow diverter positioned within said basin and adapted to receive the material to be separated;

divider means extending upwardly within said basin and dividing said basin into approximately equal parts, said divider means engaging said flow diverter circumferentially and extending transversely therefrom, said flow diverter being partially recessed within said divider means, said divider means further being oriented within said basin so as to compensate for said vibratory throw of said means to vibrate whereby the material to be separated is transmitted approximately equally to said parts of said basin;

means to feed the material within each of said equal parts to a different of said screen assemblies uniformly across one dimension of said screen assemblies so that the material may be separated by size; and means to transmit the material within at least some of said equal parts to said means to feed.

2. Apparatus according to claim 1 wherein said basin is divided into three equal parts and the points of engagement of said divider means and said flow diverter divide the circumference of said flow diverter whereby a first said part of said basin communicates with a 120° sector of said flow diverter, a second said part of said basin communicates with a 120° sector of the flow diverter diametrically opposite said first part and a third said part communicates with two 60° sectors of the flow diverter located mediate said first and second parts such that the material contacting each said sector of said flow diverter is directed to the respective said part with which it communicates.

3. Apparatus according to claim 2 wherein said means to feed includes manifold means extending across the width of at least some of said screen assemblies, each said manifold means being vertically displaced from a corresponding said screen assembly and having a discharge opening therein whereby the material to be separated is discharged vertically onto said screen assembly.

4. Apparatus according to claim 3 further comprising means to adjust the size of said discharge opening in said manifold means.

5. Apparatus according to claim 4 wherein said means to feed further includes an aperture in one of said equal parts of said basin extending across the width of one said screen assembly for discharging the material of said equal part, said aperture being vertically displaced from said screen assembly whereby the material is discharged vertically onto said screen assembly.

6. Apparatus according to claim 3 further comprising means to adjust the size of said aperture.

7. Apparatus according to claim 6 wherein each of said screen assemblies includes a first screen of a desired mesh for separating the materials and a second screen of a larger mesh adjacent to said first screen.

8. Apparatus according to claim 7 further comprising means to independently tension said first and second screens.

9. Apparatus according to claim 8 further comprising hook members at the end of said first and second screens, said means to independently tension including separate draw bolt means engaging each said hook member, and means to independently draw each said draw bolt means to independently tension each said screen.

10. Apparatus according to claim 6 wherein said means to transmit includes piping means connecting said feed splitting assembly to said means to feed.

11. Apparatus according to claim 6 further comprising means to collect the material passing through said screen assemblies.

12. Apparatus according to claim 11 wherein said means to collect includes plate means beneath at least one of said screen assemblies, means to confine the material on said plate means, a discharge spout, and means to transmit the material from said means to confine to said discharge spout.

13. Apparatus according to claim 6 further comprising means beneath said screen assemblies to agitate the same.

* * * * *

UNITED STATES PATENT AND TRADEMARK OFFICE
CERTIFICATE OF CORRECTION

PATENT NO. : 4,555,330
DATED : November 26, 1985
INVENTOR(S) : Masataka Tsutsumi and Richard J. Frohman It is certified that error appears in the above—identified patent and that said Letters Patent are hereby corrected as shown below:

Claim 6, Column 6, line 57, "3" should read --5--.

Signed and Sealed this

Eighth Day of July 1986

[SEAL]

Attest:

Attesting Officer

DONALD J. QUIGG

Commissioner of Patents and Trademarks